(12) United States Patent
Collymore (10) Patent No.: US 12,065,795 B1
(45) Date of Patent: Aug. 20, 2024

(54) APPARATUS AND METHOD FOR REMOVING WASTE

(71) Applicant: Carolin Collymore, Roslindale, MA (US)

(72) Inventor: Carolin Collymore, Roslindale, MA (US)

( * ) Notice: Subject to any disclaimer, the term of this patent is extended or adjusted under 35 U.S.C. 154(b) by 0 days.

(21) Appl. No.: 18/110,155

(22) Filed: Feb. 15, 2023

(51) Int. Cl.
*E01H 1/00* (2006.01)
*G06Q 10/30* (2023.01)

(52) U.S. Cl.
CPC ............ *E01H 1/008* (2013.01); *G06Q 10/30* (2013.01)

(58) Field of Classification Search
CPC ................................ G06Q 10/30; E01H 1/008
See application file for complete search history.

(56) References Cited

U.S. PATENT DOCUMENTS

| | | | |
|---|---|---|---|
| 4,119,386 A * | 10/1978 | Cushing | A47L 13/312 401/138 |
| 4,882,204 A * | 11/1989 | Tenenbaum | A61F 13/8405 118/308 |
| 8,292,339 B1 | 10/2012 | Auseklis | |
| 9,091,031 B2 | 7/2015 | Naseem | |
| 9,394,658 B1 * | 7/2016 | Jensen | E01H 1/1206 |
| 9,974,282 B2 | 5/2018 | Castano | |
| 10,709,111 B1 | 7/2020 | Shealey | |
| 11,118,320 B2 * | 9/2021 | Patterson | H05B 3/0014 |
| 2007/0189834 A1 * | 8/2007 | McKay | A47L 13/26 401/123 |
| 2008/0295271 A1 * | 12/2008 | Perunicic | A47L 11/405 15/246.3 |
| 2010/0100013 A1 * | 4/2010 | Hu | A61H 3/04 600/595 |
| 2012/0132233 A1 * | 5/2012 | Orubor | E01H 1/1213 134/94.1 |
| 2012/0256430 A1 * | 10/2012 | Merino-Garcia | A01K 27/004 294/1.3 |
| 2014/0246512 A1 * | 9/2014 | DeGeorge | F21V 33/0004 239/71 |
| 2022/0235527 A1 | 7/2022 | Robichaux | |
| 2022/0333323 A1 | 10/2022 | Sego | |

* cited by examiner

*Primary Examiner* — Randy W Gibson
(74) *Attorney, Agent, or Firm* — Caldwell Intellectual Property Law (57) ABSTRACT

An apparatus and method for removing waste, the apparatus including a motorized extendable shaft, a handle assembly connected to a first end of the motorized extendable shaft, wherein the handle assembly includes a grip component, at least a processor, and a memory communicatively connected to the at least processor, the memory containing instructions configuring the at least processor to receive a user input, and adjust the extension of the motorized extendable shaft as a function of the user input, and a waste removal assembly, wherein the waste removal assembly is attached to a second end of the motorized extendable shaft at a connection point.

17 Claims, 5 Drawing Sheets

APPARATUS AND METHOD FOR REMOVING WASTE

FIELD OF THE INVENTION

The present invention generally relates to the field of waste removal. In particular, the present invention is directed to an apparatus and method for removing waste.

BACKGROUND

Current apparatuses for waste removal do not optimize efficiency for a user. This can lead to lost time and frustration. There is a need for a waste removal apparatus that optimizes comfortability, operability, and efficiency for a user.

SUMMARY OF THE DISCLOSURE

In an aspect, an apparatus for removing waste, the apparatus including a motorized extendable shaft, a handle assembly connected to a first end of the motorized extendable shaft, wherein the handle assembly includes a grip component, at least a processor, and a memory communicatively connected to the at least processor, the memory containing instructions configuring the at least processor to receive a user input, and adjust the extension of the motorized extendable shaft as a function of the user input, and a waste removal assembly, wherein the waste removal assembly is attached to a second end of the motorized extendable shaft at a connection point.

In another aspect, a method for removing waste with a device including a handle assembly connected to a motorized extendable shaft and a waste removal assembly, the method including inputting a user input into an input entry pad attached to the handle assembly, wherein the user input controls the extension of the motorized extendable shaft, directing the waste removal assembly over waste on top of a surface using the handle assembly, applying a product to the surface, and picking up the waste by the waste removal assembly.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for waste removal. In an embodiment, apparatus may be used to sanitize and pick up and store pet waste. Apparatus may be utilized to optimize a comfortable and efficient user-friendly process of gathering waste for disposal. Apparatus may allow for multipurpose usage such as a sanitizer dispenser, mopping aid, extension claw and the like. In an embodiment, apparatus may include interchange assemblies that allow for multipurpose usage.

Aspects of the present disclosure allow for automated extension of apparatus and automated dispersal of cleaning products. Exemplary embodiments illustrating aspects of the present disclosure are described below in the context of several specific examples.

Figure 1:
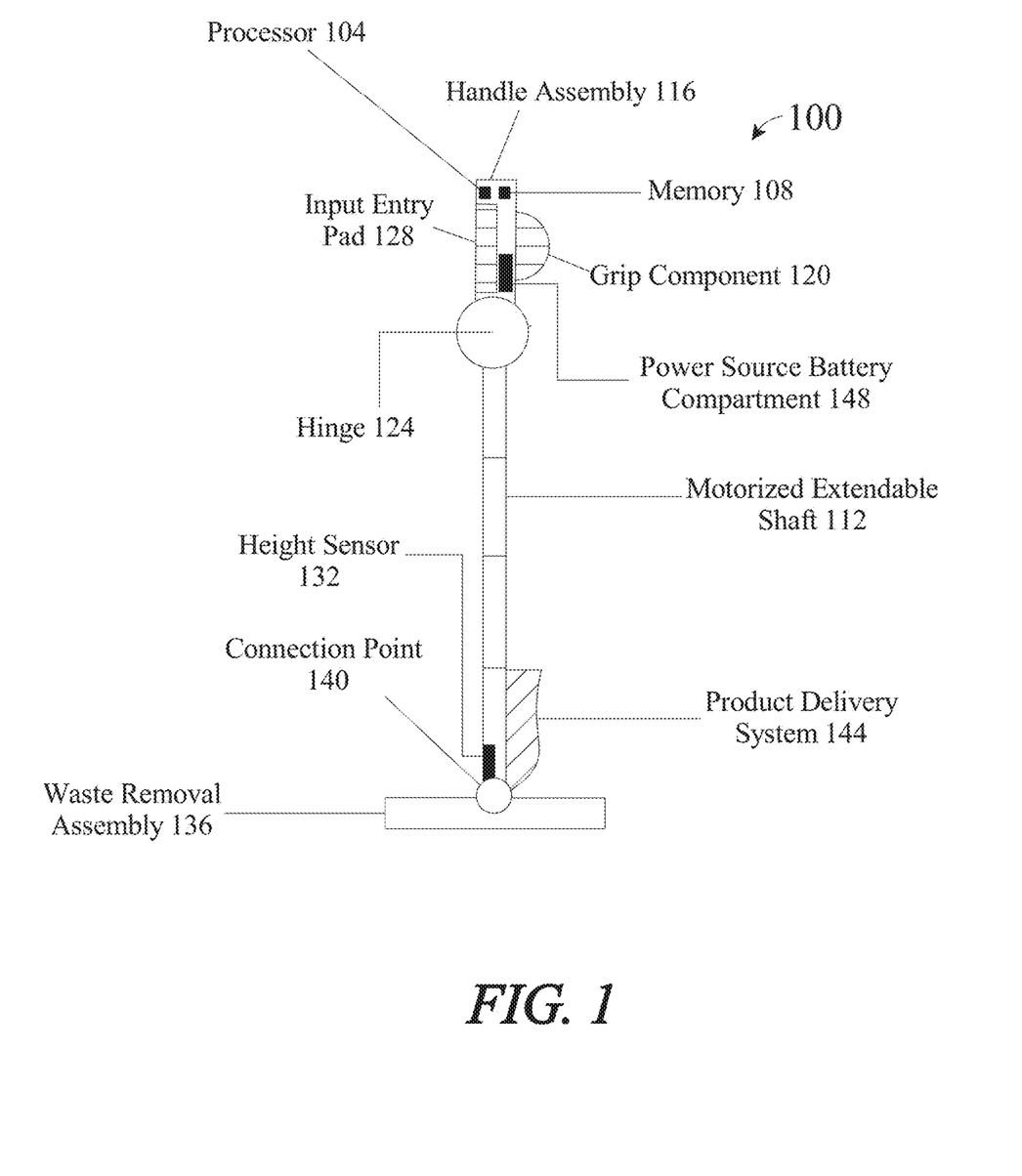
FIG. 1 is a diagram of exemplary embodiment an apparatus for removing waste.

Referring now to FIG. 1, an exemplary embodiment of an apparatus 100 for removing waste is illustrated. Apparatus 100 includes a processor 104 and a memory 108 communicatively connected to processor 104, wherein memory 108 contains instructions configuring processor 104 to carry out the automated process. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 includes a motorized extendable shaft 112, also referred to as "shaft," in this disclosure. A "motorized extendable shaft," as a used in this disclosure is a long section of an apparatus 100 that extends in length in response to actuation. Feedback may include at least a signal sent from a processor or a user interacting with apparatus 100. In some embodiments, shaft 112 may include rigid material such as, without limitation, metal, plastic and the like. In some embodiments, shaft 112 may include a first length (i.e., default length). Shaft 112 may be able to extend to a second length (i.e., maximum length), wherein shaft 112 may include any length in between first length and the second length. In a non-limiting example, shaft 112 may include a telescoping shaft, wherein the telescoping shaft 112 may extend to a maximum length of 4 to 5 feet. In some embodiments, shaft 112 may extend using a telescoping mechanism. A "telescoping mechanism," for the purposes of this disclosure, is a mechanism containing concentric parts configured to slide into each other to expand and contract. Telescoping may involve a movement of a section of shaft 112 sliding out from another section of shaft 112, thereby lengthening shaft 112. Through a telescoping mechanism, shaft 112 may include an outer part in the form of a sleeve and an inner part in the form of a shaft portion. The inner part may enter a bore of the outer part in the direction of the common longitudinal axis of both parts. In some embodiments, shaft 112 may extend utilizing an expansion joint. An "expansion joint," as used herein, is a component configured expand in length to aid in the extension of a shaft. An expansion joint may include a rubber, plastic, or metal coil or spring connecting a section of shaft 112 to an opposite section of shaft 112, wherein the coil expands, extending the total length of shaft 112 and recoils, decreasing the total length of shaft 112. For example, an extension joint may be placed in the middle of shaft 112, first/top end of shaft 112, or a second/bottom end of shaft 112. Expansion joints may include flexible bellows, accordion bellow, single expansion joints, hinged expansion joints, gimbal expansion joints, universal expansion joints, and the like. In some embodiments, extension joint may include a bellows mechanism. In some embodiments, extension joint may include a pantograph.

Still referring to FIG. 1, in some embodiments, shaft 112 may be extended by an actuation system controlled by processor 104. As used in this disclosure, an "actuation system" or "actuator" is a system that is configured to provide power, work, or energy to generate a movement, as described further below. In some cases, an actuation system may be mechanically communicative with hinge and provide power, work, or energy to move the hinge. In some embodiments, the actuator may be located within and throughout shaft 112. An actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors 228a-b may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors 228a-b may controlled be directly controlled by a control signal for controlling one or more linear motor parameters. Exemplary linear motor parameters include without limitation position, force, velocity, potential, and current.

With continued reference to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Still referring to FIG. 1, apparatus 100 includes a handle assembly 116 connected to a first end of the motorized extendable shaft 112, wherein the handle assembly 116 comprises a grip component 120. The first end may refer to a top or bottom end of shaft 112. For example, handle assembly 116 may be located at the top end of shaft 112. A "handle assembly," as used in this disclosure, is a base of the apparatus designed for user interaction. User interaction may include a user picking up and holding apparatus 100. Handle assembly 116 may include a grip component 120. A "grip component," as used herein, is a section of handle assembly designed be held by a user. A grip component 120 may allow for a user to take a firm hold of handle assembly 116 and apparatus 100. A grip component 120 may be composed of an ergonomic material, such as gels, foams, rubbers, plastics and the like. An "ergonomic material," as used herein, is a material designed or chosen for efficiency and comfort in the working environment. For example, a gel material that molds to a user's hand would make it more comfortable for a user to grip and use apparatus 100 for an extended period of time. Handle assembly 116 and/or grip component 120 may be contoured/shaped in a way that optimizes a comfortable grip for user, minimize forceful exertion, repetitive motion, contact stress and vibration that can produce discomfort, fatigue and even injury while utilizing apparatus 100. For example, handle assembly 116 may include a curved handlebar shape, wherein grip component 120 includes a gel cushion along the curve that molds to the form of a user's grip. In some embodiments, handle assembly 116 may be attached to shaft 112 by a hinge 124. A "hinge," as used herein, is a mechanism that is attached to at least two components and allows for limited movement of the at least two components relative one another. In some cases, a hinge may include a bearing element. In some cases, a hinge may allow for rotation between at least two components, for example over a limited range of motion. Hinge 124 may be a solid piece of material such as plastic, metal, or rubber tubing. Hinge 124 may include hooks, pins, ties, and the like. Hinge 124 may include a movable joint, for example, a ball-bearing hinge, wherein a hinge is equipped with ball bearings to reduce friction.

Still referring to FIG. 1, apparatus 100 includes at least a processor 104 and a memory 108 communicatively connected to the at least processor 104, the memory 108 containing instructions configuring the at least processor 104 to receive a user input and adjust the extension of the motorized extendable shaft 112 as a function of the user input. Processor 104 and memory 108 may be located in handle assembly 116. Processor 104 and memory 108 may be located in motorized extendable shaft 112. A "user input," as used herein, is data received from a user. User input may relate to the extension length, speed, and height of shaft 112. In some embodiments, handle assembly 116 may include an input entry pad 128 to receive user input. A "input entry pad," as used herein, is a pad of buttons communicatively connected a processor and configured to receive and transmit a user input. Input entry pad may include arrangement of digits, symbols, and/or alphabetical letters. For example, input entry pad 128 may include an up and down arrow button indicating whether the shaft 112 is to extend outward or inward. Input may include numerical buttons indicating a preset extension of shaft 112 or speed of shaft 112 extension. A preset may include extension datum to be received by the processor to extend shaft 112. Extension datum may relate to the extension range of shaft 112. Extension datum may be received as part of user input. For example, button numbered 1 may have a preset to extend shaft by 1 ft. A button numbered 2 may have a preset to extend shaft by 112 by 2 ft. A button numbered 3 may have a preset to contract shaft 112 by a ft. A user may press a button once for automated extension of shaft 112 to a preset range. A user may press and hold a button to slowly and continuously extend or contract shaft 122 until a desired length is achieved or the button is released. Processor 104 may receive user input through the input entry pad and extend shaft 112 automatedly. In some embodiment, processor 104 may receive user input from a user computing device communicatively connected to processor 104. For example, user computing device may include a user's smart watch, smartphone, laptop, and the like. In some embodiments, Processor 104 may receive user input utilizing automatic speech recognition. "Automatic speech recognition (ASR),' as used herein, is a technology that converts spoken language (an audio signal) into machine encoded data as a command. For example, a user may voice "extend by 3 ft," wherein the processor 104 receives that spoken language as a user input and extends shaft 112 by 3 ft.

Still referring to FIG. 1, in some embodiments, automatic speech recognition may require training (i.e., enrollment). In some cases, training in an automatic speech recognition model may require an individual speaker to read text or isolated vocabulary. In some cases, a solicitation video may include an audio component having an audible verbal content, the contents of which are known a priori by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Alternatively or additionally, in some cases, processor 104 may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow processor 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example and as described further below. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, apparatus 100 may include a height sensor 132 communicatively connected to the at least a processor 104, configured to communicate extension datum to the processor, wherein the processor automatedly adjusts the extension of the motorized extendable shaft 112. A "height sensor," as used herein is a sensor used to measure the distance between the bottom end of an apparatus and an object. For example, the distance from the bottom end of apparatus 100 and the ground. A height sensor 132 may include an ultrasonic sensor, LIDAR sensor, infrared distance sensors, laser distance sensors, vertical-cavity surface-emitting laser sensor, light-emitting diode sensor, and the like. Height sensor 132 may be located on the second/bottom end of shaft 112. Processor 104 may utilize height sensor 132 to extend or recede shaft 112 based on the distance between an object and the height sensor 132 is pointed at. As a non-limiting example, height sensor may detect a height datum, wherein the height datum represents the height of the height sensor 132 off of the ground. Continuing with this example, processor 104 may receive height datum and extend shaft 112 by a length such that waste removal assembly 136 is near or adjacent to the ground. In some embodiments, processor 104 may subtract a waste removal assembly distance from height datum to determine the distance from the waste removal assembly to the ground. For the purposes of this disclosure, "waste removal assembly distance" is the distance between height sensor and waste removal assembly. For example, a user may grip handle assembly 116 at the top end of shaft 112 to point the bottom end to waste located on the floor, utilizing the height sensor 132, processor 104 may extend shaft 112 to a length appropriate for picking up the waste.

Still referring to FIG. 1, apparatus 100 includes a waste removal assembly 136, wherein the waste removal assembly 136 is attached to a second end of the motorized extendable shaft 112 at a connection point 140. A "waste removal assembly," as used herein is a component of apparatus 100 designed to pick up waste. A "connection point," as used herein a component used to attach items to the apparatus 100. Connection point 140 may be used to attach a variety of waste removal assemblies to apparatus 100. Connection point 140 may include movable joints, screws, hooks, pins, ties, and the like to attach waste removal assembly 136 to shaft 112. Waste removal assembly may snap or slide into shaft 112 by connection point 140 utilizing an interference fit. An "interference fit," as used herein is, a form of fastening between two tight fitting mating parts that produces a joint which is held together by friction after the parts are pushed together. Parts and assemblies may be snapped together by the force of a user pushing them together. In some embodiments, connection point 140 may include a locking mechanism. A "locking mechanism," as used herein, is a mechanical system which provides assistance to the coupling and uncoupling of two connectors and the fixation of the two parts in operating position. A locking mechanism may automatically engage when a new assembly is attached. Thus, a user may need to press an unlock button to disengage the lock and remove the assembly. Alternatively, it may be manually engaged by the user by sliding or snapping an assembly into place. A locking mechanism may include hooks, pins, screws that tighten or fasten when waste removal assembly 136 snaps into shaft 112. For example, connection point 140 may include pins located on the outside, wherein a user is to press the pins inward and slide waste removal assembly 136 over connection point 140. Waste removal assembly may include pin holes, wherein the pins located on connection point 140 may pop outward into, thus locking the parts into place. A user may unlock the parts by pushing the pins inward and sliding waste removal assembly off.

Still referring to FIG. 1, waste removal assembly 136 may include a mop head to absorb and wipe up liquids as described further below. Waste removal assembly 136 may include a basket, wherein the basket is configured to pick up and store waste. A basket may include a container. Basket may be configured to hold and/or store pet waste. A basket may include baskets in various shapes such as, without limitation, round shape, rectangular shape, and the like. Basket may include different sizes (i.e., volumes); for instance, for small size pet, a small basket may be used. In some embodiments, basket may include a lid, wherein the lid is a cover for top of the basket. In some cases, the lid may be removeable. In other cases, the lid may be hinged to the basket. The basket may include a liner. As used in this disclosure, a "liner" is a piece of material designed for absorbing liquids. For example, cotton, rayon, wool, fleece, hemp, sponge, sodium polyacrylate, anhydrous calcium chloride, allochronic silica gel, activated carbon, and the like. In some embodiments, the back of the liner may be waterproof and resistant to most chemicals. For example, the back of the liner may include materials or coatings such as polyurethane laminate, thermoplastic polyurethane, waxed cotton, nylon and polyester, laminated cotton, plastic, rubbers, oilcloth, vinyl, pleather, and the like. In a non-limiting example, basket may include a strainer. A "strainer," as used herein, is a device having holes for separating content. For example, the strainer may be used to separate solid waste from liquids or smaller matter. In some cases, the liner may be attached to the edges (either inner edges or outer edges) on top of the basket. In some embodiments, liner may be able to detach from the basket. Basket and/or liner may be washable. In some embodiments, basket and/or liner may be made of durable material such as, without limitation plastic material, biodegradable material (i.e., soy based), and the like. Plastic may be made of recycled material. In some embodiments, the connection point 140 may be rotatable. In a non-limiting example, apparatus 100 may hover in an area containing pet waste. Apparatus 100 may catch dried pet waste using the basket. Apparatus 100 may be able to twist the basket along by connection point 140 with the liner to clean up fluidic pet waste. In some embodiments, an actuator may rotate waste removal assembly 136 about connection point 140. In some embodiments, actuator may rotate waste removal assembly 136 about connection point 140 in response to a user input on input entry pad 128.

Still referring to FIG. 1, apparatus 100 may include a black light which may be attached to the waste removal assembly 136 and configured to help identify waste. A "black light," as used herein is a device that emits long-wave (UV-A) ultraviolet light and very little visible light. Wavelengths in a black light cause phosphorous and proteins in the urine to glow, making it easier to spot stains. A black light may include black light bulbs (BL) and black light blue bulbs (BLB), light-emitting diodes (LEDs), lasers, and the like.

Still referring to FIG. 1, apparatus 100 may include a product delivery system 144 attached along the length of the motorized extendable shaft 112. A "product delivery system," as used herein is a device configured to disperse a product. The product delivery system 144 may be configured to disperse a product at the bottom end of shaft 112 to aid in waste removal assembly 136 pick up. A product may include liquid sanitizer or a powder to absorb fluids. In some embodiments, input entry pad 128 may include a product button to receive a user input including a product selection to be dispersed by the product delivery system 144. For example a user may select a powder to be dispersed over the waste by the input entry pad 128. Product delivery system 144 may be a component detachable to apparatus 100.

Still referring to FIG. 1, apparatus 100 may include a power source battery compartment 148, wherein the power source battery compartment 148 is configured to power the apparatus 100. In some embodiments, one or more batteries may provide electrical power for performing one or more functions of the apparatus 100 described above, such as the telescoping function of shaft 112. In some embodiments, batteries may be rechargeable. In some embodiments, the user may detach one or more batteries from the apparatus 100. In some embodiments, batteries may include lithium-ion batteries, alkaline batteries, and/or the like. In some embodiments, power source battery compartment 148 may be configured to accept common types of batteries, such as, as non-limiting examples, AA batteries, AAA batteries, D cell batteries, and the like. In some embodiments, the power source battery compartment may include solar panels for solar power.

Figure 2A:
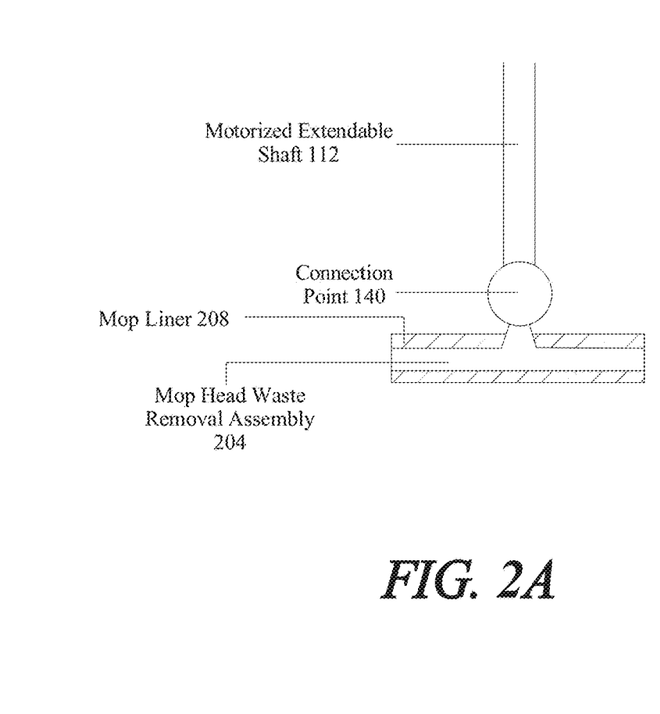
FIG. 2A is a diagram of exemplary embodiment of a waste removal assembly.
Figure 2B:
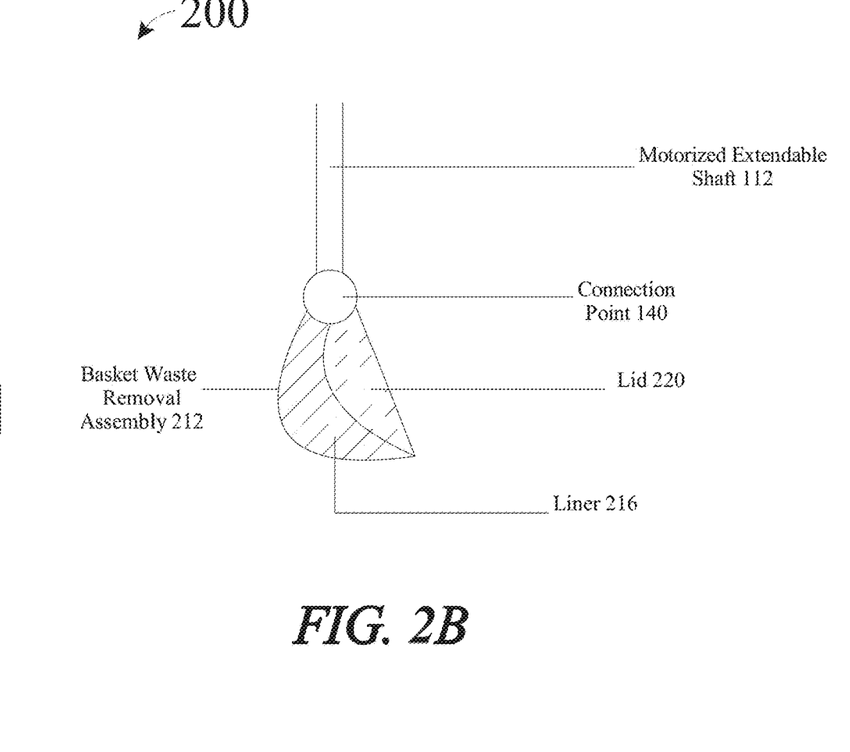
FIG. 2B is a diagram of exemplary embodiment of a waste removal assembly.

Referring now to FIG. 2A and FIG. 2B, are exemplary embodiments of a waste removal assembly 200. FIG. 2A depicts a mop head waste removal assembly 204 connected to apparatus 100 by connection point 140. In some embodiments mop head 204 may include a mop liner 208. A "mop head," as used herein, is a component comprising an absorptive material, configured to wipe down floors or surfaces. For example, a fastening pin used to connect a bundle of cleaning reagents to the end of apparatus 100. A "mop liner," as used herein, is material attached to a mop head and designed to absorb waste. Mop liner 208 may include boardable material and washable material as described above. In some embodiments, mop liner 208 may include microfiber fabric. FIG. 2B depicts a basket waste removal assembly 212. Basket waste removal assembly 212 may include a curved shape in order to scope up waste. Basket waste removal assembly 212 may be made of mesh and/or biodegradable material such as paper, bamboo, cork, tipa bio-plastic polymers, mycelium, hemp, jute, wood, *areca*, palm leaf, avocado bioplastic, wood, and the like. Basket waste removal assembly 212 may include a liner 216 located on the inside of basket waste removal assembly 212 to aid in storage of waste as described above. Liner 216 may be made of biodegradable material such as cotton and the like as described above. Basket waste removal assembly 212 may include a lid 220 that automatically opens by processor command as a function of a user input as desired above. For example, input entry pad 128 may include a lid button configured to transmit a user input related to the closing and opening of lid 220 to the processor. The processor may utilize a lid actuator attached to lid 220 and apparatus 100 to carry out the user input. Lid actuator may be configured to rotate lid 220 about a hinge, wherein the hinge attaches lid 220 to basket waste removal assembly 212. Lid actuator may be consistent with any lid actuator described in this disclosure.

Figure 3:
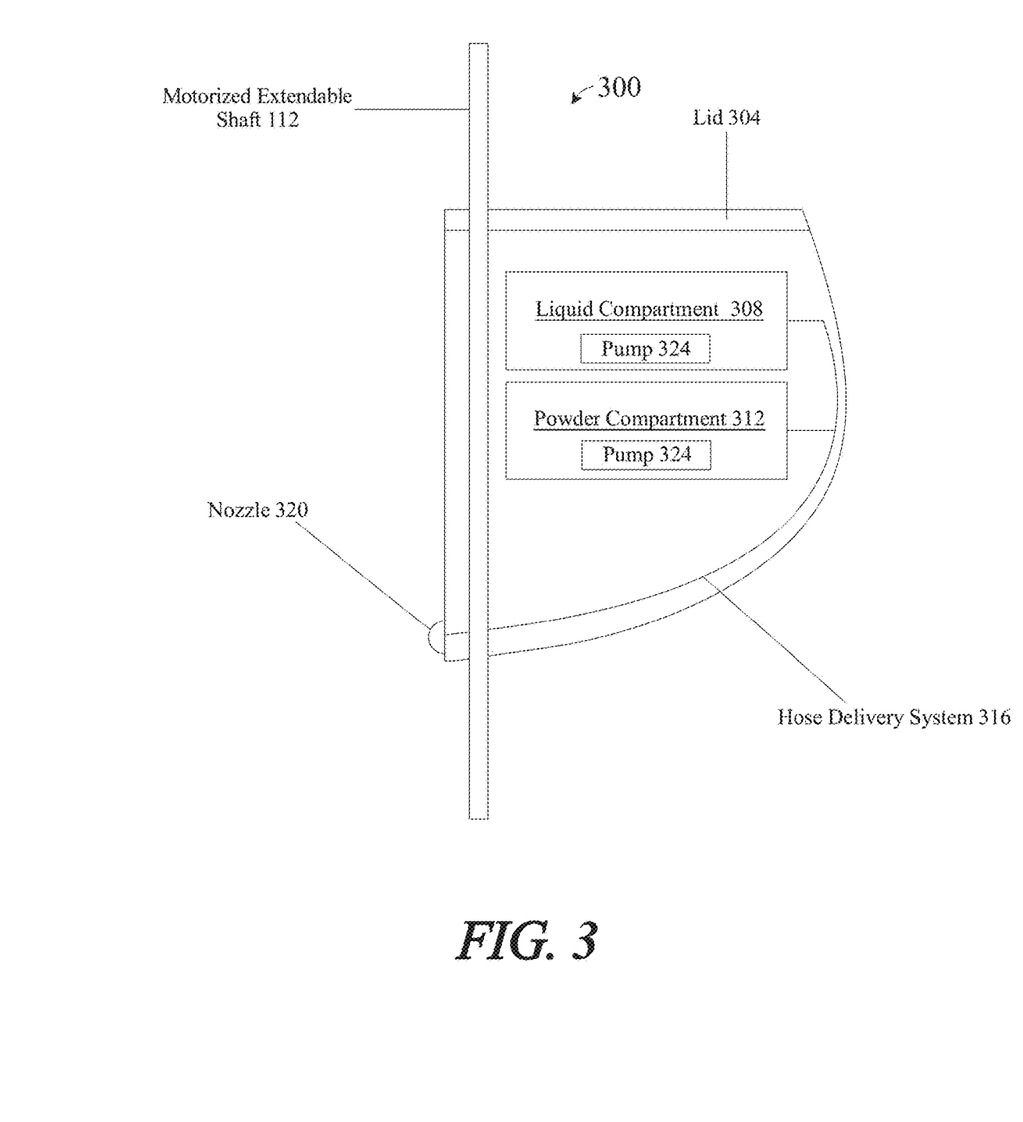
FIG. 3 is a block diagram of exemplary embodiment of a product delivery system.

Referring now to FIG. 3, is an exemplary embodiment of a product delivery system 300. Product delivery system 300 may include a section or gap that allows shaft to slide into and or allows product delivery system to hook onto shaft 112. Product delivery system 300 may include a lid 304 allowing access to the inside of the system. Product delivery system 300 may contain a liquid compartment 308, wherein liquid cleaning products may be contained and refilled. Product delivery system 300 may contain powder compartment 312, wherein powder cleaning products may be contained and refilled. Each compartment may be connected to a hose delivery system 316. A "hose delivery system," as used herein is a hose configured to disperse a product. In some embodiments, a hose delivery system 316 may be fluidly connected to a nozzle 320 end of product delivery system 300 to aid in dispensing a product. A "nozzle," as used herein, is a round spout at the end of a system used to control a jet of liquid. Hose delivery system 316 may be fluidly connected to liquid compartment 308 and/or powder compartment 312. For the purposes of this disclosure, "fluidly connected" refers to objects that are connected such that fluid may flow from one object to another. Hose delivery system 316 may include a pump 324 communicatively connected to the processor. Pump 324 may include a substantially constant pressure pump (e.g., centrifugal pump) or a substantially constant flow pump (e.g., positive displacement pump, gear pump, and the like). Pump 324 can be hydrostatic or hydrodynamic. As used in this disclosure, a "pump" is a mechanical source of power that converts mechanical power into fluidic energy. Pump 324 may generate flow with enough power to overcome pressure induced by a load at a pump outlet. Pump 324 may generate a vacuum at a pump inlet, thereby forcing fluid from a reservoir, such as liquid compartment 308 and powder compartment 312, into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed. In some embodiments, hose delivery system 316 may include a plurality of pumps 324, wherein each pump is connected to a separate product compartment, Product delivery system 300 may disperse a product as a function of user input. For example, input entry pad 128 may include a liquid product button and a powder product button to receive a user input regarding a product selection for dispersion. The processor 104 may receive the user input by input entry pad 128 and turn on pump 324 connected to the corresponding compartment. For example, a user input for a liquid product may transmit as processor 104 command to turn on a pump 324 connected to liquid compartment 308 for a liquid product to be dispersed through the hose and nozzle. In some embodiments, processor 104 may receive a user input indicating a product to dispense and signal an actuator to open a valve in fluid communication with that product compartment, so that the product may flow and/or be dispensed out of that compartment.

Figure 4:
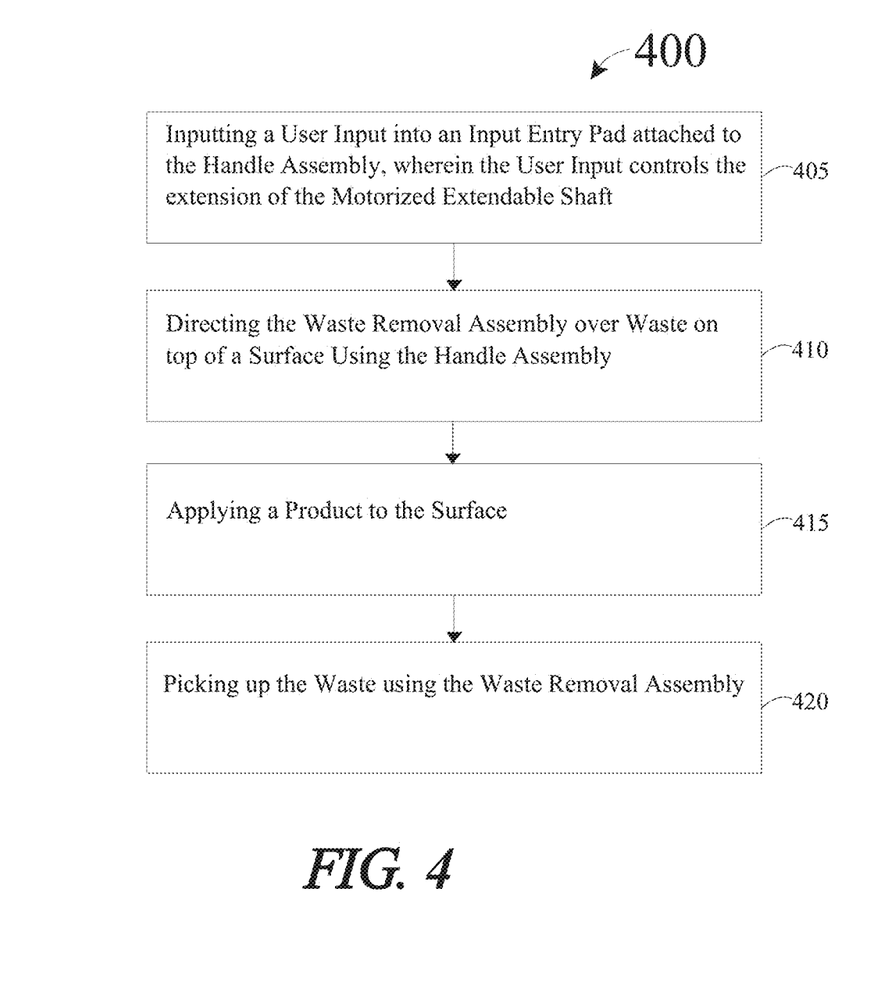
FIG. 4 is flow diagram of an exemplary method for removing waste with a device comprising a handle assembly connected to a motorized extendable shaft and a waste removal assembly.

Referring now to FIG. 4, is an exemplary flow diagram of a method 400 for removing waste with a device comprising a handle assembly connected to a motorized extendable shaft and a waste removal assembly. At step 405, method 400 includes inputting a user input into an input entry pad attached to the handle assembly, wherein the user input controls the extension of the motorized extendable shaft, for example, and as implemented in FIGS. 1-6. In some embodiments, inputting the user input may include utilizing a height sensor configured to automatically adjust the extension of the motorized extendable shaft. At step 410, method 400 includes directing the waste removal assembly over waste on top of a surface using the handle assembly, for example, and as implemented in FIGS. 1-3. In some embodiments, directing the waste removal assembly over waste on top of a surface may include utilizing a black light, attached to the waste removal assembly, configured to identify waste. At step 415, method 400 includes applying a product to the surface. Applying a product to the surface comprises utilizing a product delivery system attached along the length of the motorized extendable shaft, for example, and as implemented in FIGS. 1-3. In some embodiments, applying a product to the surface from a product delivery system may include applying a powder to absorb fluids. At step 420, method 400 includes picking up the waste by the waste removal assembly, for example, and as implemented in FIGS. 1-3.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
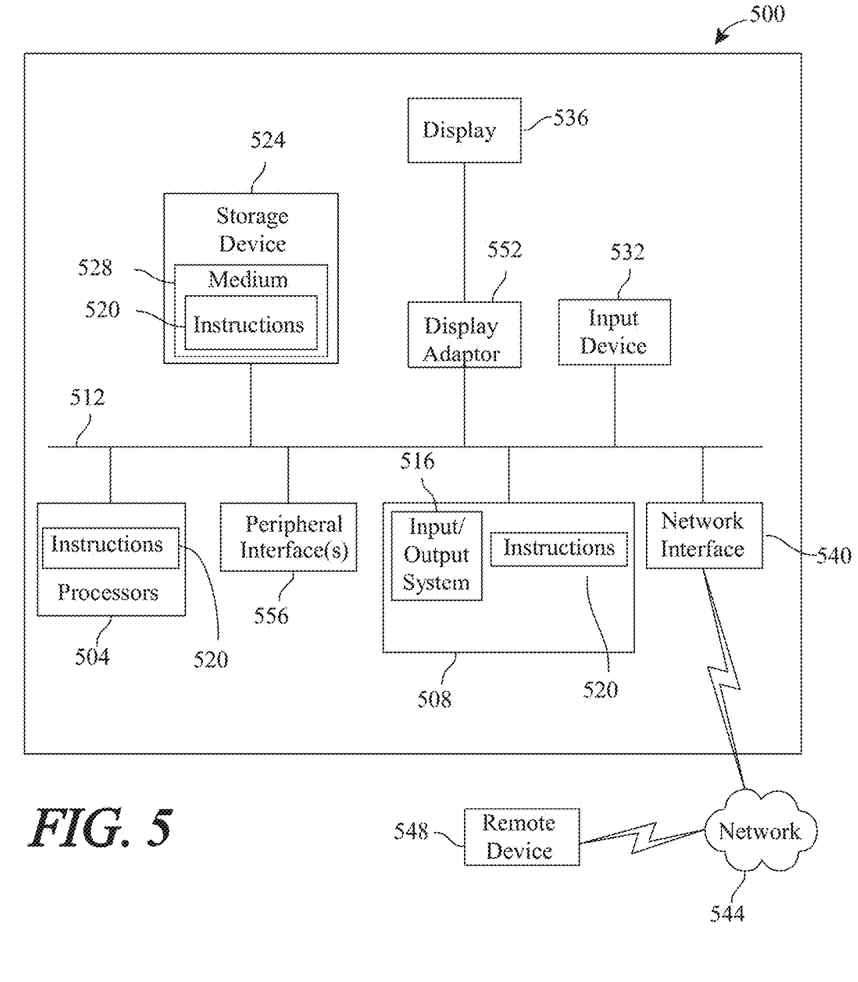
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for removing waste, the apparatus comprising:
    a motorized extendable shaft;
    a handle assembly connected to a first end of the motorized extendable shaft, wherein the handle assembly comprises a grip component;
    at least a processor; and
    a memory communicatively connected to the at least processor, the memory containing instructions configuring the at least processor to:
        receive a user input; and
        adjust an extension of the motorized extendable shaft as a function of the user input; and
    a waste removal assembly comprising a curve shaped basket configured to pick up and store waste, and a lid configured to automatically open as a function of a processor command, wherein the waste removal assembly is attached to a second end of the motorized extendable shaft at a connection point.

2. The apparatus of claim 1, further comprising a height sensor communicatively connected to the at least a processor, configured to transmit extension datum to the processor.

3. The apparatus of claim 1 further comprising a black light attached to the waste removal assembly and configured to identify waste.

4. The apparatus of claim 1, wherein the grip component comprises an ergonomic material.

5. The apparatus of claim 1, wherein the handle assembly comprises an input entry pad configured to receive the user input.

6. The apparatus of claim 1, wherein the user input comprises a height selection related to the extension of the motorized extendable shaft.

7. The apparatus of claim 1, further comprising a product delivery system attached along the length of the motorized extendable shaft.

8. The apparatus of claim 7, wherein:
    the user input comprises a product selection; and
    the memory contains instructions further configuring the at least a processor to disperse, using the product delivery system, a product as a function of the user selection.

9. The apparatus of claim 7, wherein a product of the product delivery system comprises liquid sanitizer.

10. The apparatus of claim 7, wherein a product of the product delivery system comprises a fluid absorption powder.

11. The apparatus of claim 1, wherein the basket comprises a fluid absorption liner.

12. The apparatus of claim 1, wherein the liner comprises a biodegradable material.

13. A method for removing waste with a device comprising a handle assembly connected to a motorized extendable shaft and a waste removal assembly, the method comprising:
    inputting a user input into an input entry pad attached to the handle assembly, wherein the user input controls the extension of the motorized extendable shaft;
    directing the waste removal assembly over waste on top of a surface using the handle assembly;
    applying a product to the surface; and
    picking up the waste using the waste removal assembly, wherein the waste removal assembly comprises a curve shaped basket configured to pick up and store waste, and a lid configured to automatically open as a function of a processor command.

14. The method of claim 13, wherein inputting the user input further comprises utilizing a height sensor configured to detect extension datum.

15. The method of claim 13, wherein directing the waste removal assembly over waste on top of a surface further comprises utilizing a black light attached to the waste removal assembly, wherein the black light is configured to identify waste.

16. The method of claim 13, wherein applying a product to the surface comprises utilizing a product delivery system attached along the length of the motorized extendable shaft to apply the product.

17. The method of claim 13, wherein removing the waste further comprises catching the waste.

* * * * *